March 25, 1969          A. VOGE          3,434,354
SPRING DRIVEN GYROSCOPE
Filed April 1, 1966
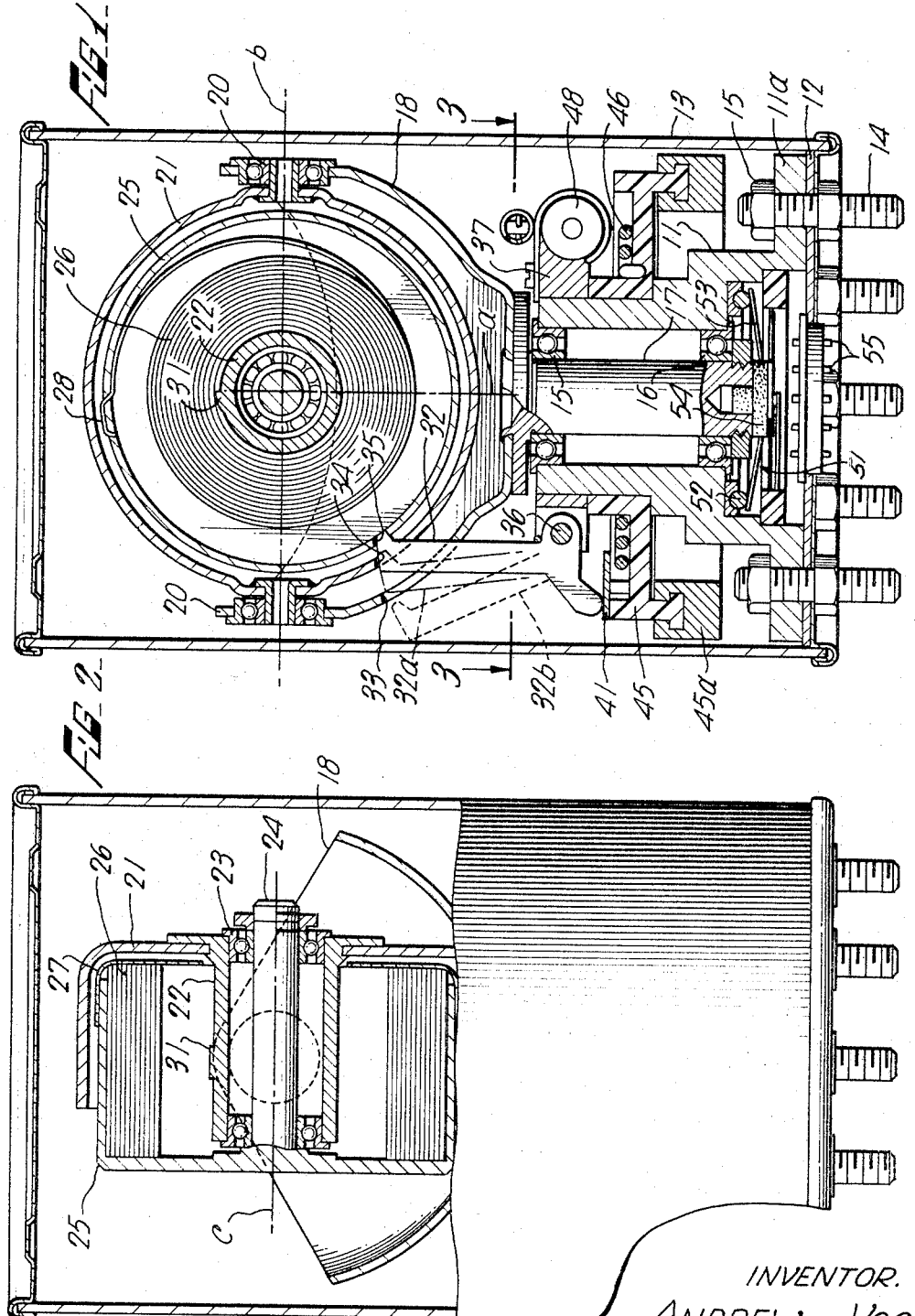
INVENTOR.
ANDREW VOGE
BY.
ATTORNEY.

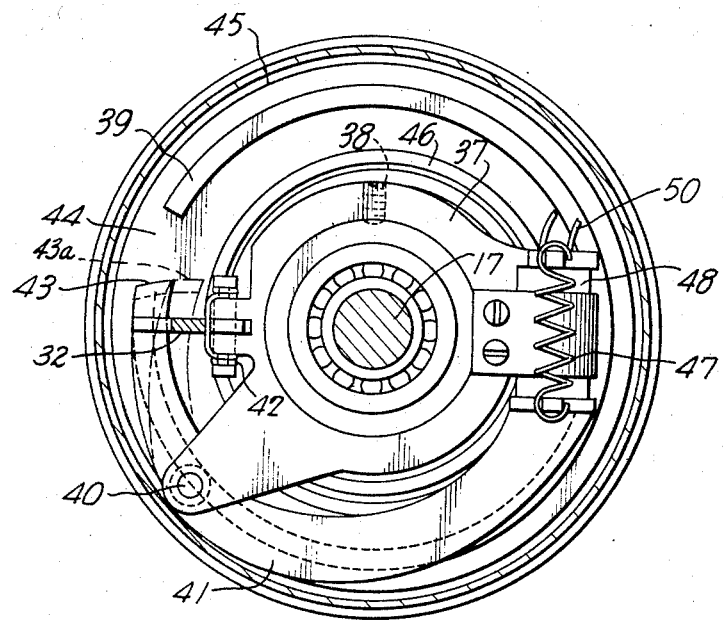
FIG_3_

March 25, 1969  A. VOGE  3,434,354
SPRING DRIVEN GYROSCOPE
Filed April 1, 1966  Sheet 3 of 3
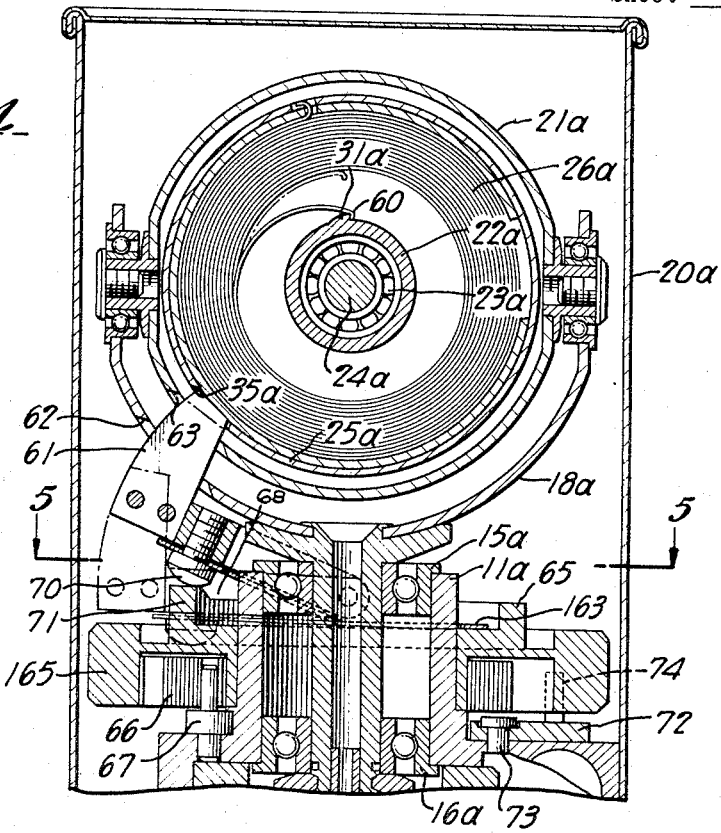
FIG_4_
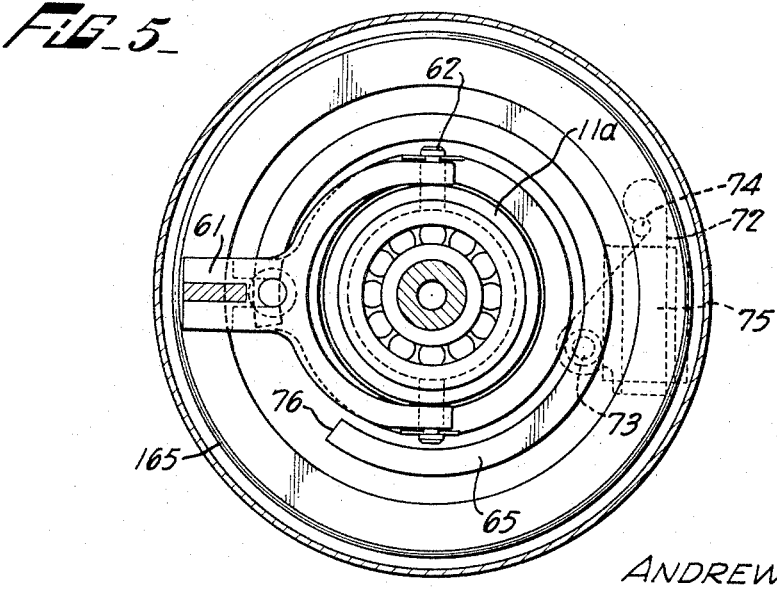
FIG_5_
INVENTOR.
ANDREW VOGE
BY
ATTORNEY.

United States Patent Office 3,434,354
Patented Mar. 25, 1969

3,434,354
SPRING DRIVEN GYROSCOPE
Andrew Voge, Canoga Park, Calif., assignor to Clary Corporation, San Gabriel, Calif., a corporation of California
Continuation-in-part of application Ser. No. 508,448, Nov. 18, 1965. This application Apr. 1, 1966, Ser. No. 547,682
Int. Cl. G01c 19/24
U.S. Cl. 74—5.12                    13 Claims

ABSTRACT OF THE DISCLOSURE

A gyroscope having inner and outer gimbals with a rotor drive spring intermediate the inner gimbal and the rotor and a combined rotor latching and gimbal caging member effective to first unlatch the rotor for rotation by the spring and, after a predetermined time period, to effect uncaging.

---

The present application is a continuation-in-part of my copending application, Ser. No. 508,448, filed on Nov. 18, 1965 for Spring Driven Gyroscope, and now abandoned.

This invention relates to spring driven gyroscopes for use in controlling guided missiles or other expendable craft in which the duration of flight is relatively short, generally on the order of a few seconds.

It is highly desirable to have a missile of the above type always ready for immediate use so that it may be fired as soon as the target is sighted. Therefore, in order to avoid expensive gyroscope construction in which the bearings and other parts are designed for extremely long life to permit continuous operation of the gyroscope rotor, it has recently been the practice to rapidly spin the rotor to proper operating speed by means of a spring just prior to launching the missile. By producing a rotor having a relatively light initial mass and transferring the mass of the spring to the rotor as the spring unwinds, the entire rotor mass may be very quickly brought up to controlling speed before launching. Although the rotor thereafter coasts, it will not decelerate below a critical control speed during its effective flight.

Since such missiles are expendable, the gyroscope must be inexpensive and yet as small and reliable as possible.

Therefore, it becomes a principal object of the present invention to provide a spring driven gyroscope of the above type which may be manufactured and assembled at a relatively low cost.

Another object is to provide a spring driven gyroscope of the above type which is small and compact and yet sensitive enough to accurately guide a guided missile or the like through an intended path.

Another object is to provide a gyroscope of the above type which will withstand high shock loads.

Another object is to provide a gyroscope of the above type which may be readily manufactured in sub-assembly units which may be readily assembled into a complete gyroscope.

A further object is to provide a spring driven free gyroscope of the above type having means for readily changing the delay time between release of the rotor for rotation and the uncaging of the gimbals.

The manner in which the above and other objects of the invention are accomplished will be readily understood on reference to the following specification when read in conjunction with the accompanying drawings, wherein:

FIG. 1 is a sectional view through a gyroscope embodying a preferred form of the present invention.

FIG. 2 is a view, partly in section, taken at right angles to FIG. 1.

FIG. 3 is a sectional plan view taken substantially along line 3—3 of FIG. 1.

FIG. 4 is a sectional view, similar to FIG. 1, but illustrating a modified form of the invention.

FIG. 5 is a sectional plan view taken substantially along line 5—5 of FIG. 4.

Referring in particular to FIG. 1, the gyroscope comprises a tubular base 11 having a flanged portion 11a which is mounted on an end cover 12 of a protective casing 13 and is secured thereto by studs 14 against which the base is clamped by nuts 15. The studs extend downwardly for attachment to a suitable bracket or other supporting element in a guided missile or other dirigible craft (not shown).

Ball bearings 15 and 16 are fitted within the tubular portion of the base 11 adjacent opposite ends thereof to rotatably support the spindle 17 of a generally semi-spherical outer gimbal 18, preferably formed of sheet metal, for rotation about an outer gimbal axis $a$.

The outer gimbal 18 supports a pair of coaxially arranged ball bearings 20 which rotatably support a cup-shaped inner gimbal 21, preferably formed of sheet metal, for movement about an inner gimbal axis $b$ extending perpendicular to and intersecting the outer gimbal axis. The inner gimbal has a sleeve 22 integral therewith in which are mounted ball bearings 23 supporting the axle 24 of a light thin shelled rotor 25 for rotation about a spin axis $c$ extending perpendicular to and intersecting the axis $b$ at the point of intersection of axis $a$.

A torsion or clock spring 26 is located within the rotor 25 and is contained therein by a thin shelled cap 27 which is suitably secured to the outer surface of the rotor. The spring 26 is permanently secured at its outer end 28 to the peripheral wall of the rotor 25 and has an opening in its inner end which is arranged to be coupled to a hook formation 31 on the inner gimbal sleeve 22.

When in wound condition, the main body of the spring is wrapped around the sleeve 22, as shown in FIG. 2, and exerts a torque tending to rotate the rotor.

The rotor is held in energized position by a combined latch and caging lever 32 which normally extends through a clearance opening 33 in the outer gimbal and through a close fitting caging slot 34 in the inner gimbal and engages a latching slot 35 in the rotor 25. The latch lever 32 is pivotally supported at 36 on a block 37 which is fitted over the upper end of the tubular base 11 and is secured thereto by a set screw 38. Also pivoted on the block 37 by means of a pivot pin 40 is a release or trigger pawl 41, the latter normally underlying the latch lever 32 to prevent the latch lever from releasing the rotor under the urge of spring 26. The pawl 41 is normally held in its latching position by a tension spring 47 extending between the same and the block 37. The pawl 41 also has a depending tip 43 which normally extends downwardly into an opening 44 in an annular flange 39 formed on a time delay ring 45 and engages one end of the flange to prevent rotation of the ring. The ring is rotatably mounted on the base 11 intermediate the flange portion 11a thereof and the block 37 and carries a relatively heavy rim 45a. The ring 45 is urged clockwise, as viewed in FIG. 3, about the gimbal axis $a$ by a torsion spring 46. The latter spring is attached at one end thereof to the ring 45 and at the other end of the block 37. There is a slight clearance (not shown) between the pawl 41 and the upper surface of the flange 39, permitting the ring 45 to rotate relative to the pawl when the latter is rocked about its pivot pin 40, as will be described later.

Mounted on the block 37 is an electrically operated explosive powder squib 48 having its firing electrodes connected by wire leads 50 to certain of a plurality of terminals 55 carried by the casing end cover 12.

An attitude pickoff device, generally indicated at 51, is provided to indicate the attitude of the base 11, and consequently of the missile, relative to the outer gimbal 18. Such pickoff is shown as being of the potentiometer type comprising a ring 52 of resistance material mounted on a ring 52a of insulating material fitted within and suitably secured to the base 11, which ring 52 is engaged by a wiper brush 53 mounted on a button 54 of insulating material which is secured to the lower end of the outer gimbal member spindle 17.

As the missile, to which the base 11 and casing 13 are attached, is moved about the outer gimbal axis, the resistance of a pickoff circuit (not shown), connected through terminals 55 and the ring 52, varies accordingly and the resulting signal will indicate the direction and extent of movement to which the missile has departed from the gyro reference established by the rotor.

In the operation of the gyroscope, it should be noted that it is normally carried in a missile in an energized and caged condition, as shown in FIG. 1, and after a target is sighted and the missile is aimed toward the same, a signal is applied through the terminals 55 to fire the explosive squib 48, forcing the pawl 41 clockwise about its pivot pin 40 against the action of spring 47 to release the latch lever 32 permitting it to rock counter-clockwise a slight amount to its dot-dash position 32a under the urge of a torsion spring 42 so as to remove its tip from the slot 35 and thus release the rotor for rotation. At this time, the under surface of the latch lever 32 engages the upper surface of the blocking ring 45 and holds the latch lever in its dot-dash position 32a preventing withdrawal of the tip of the latch lever from the caging slot 34 in the inner gimbal. At approximately the same time, the tip 43 (FIG. 3) of release pawl 41 is removed from blocking engagement with the end of the flange 39, to its dot-dash line position 43a permitting torsion spring 46 to spin the blocking ring 45 about the outer gimbal axis. In the meantime, however, the rotor spring 26 exerts a strong starting torque against the rotor 25 which at this time has a relatively small mass, to cause a rapid rotation of the latter. As the spring 26 unwinds from the sleeve 22, it winds onto the inner periphery of the rotor, as shown in FIG. 2, until finally it disengages from the hook portion 31 of the sleeve 22 and forms an integral part of the rotating mass of the rotor. This build up of speed of the rotor and transfer of the spring to form the rotor mass occurs before the ring 45, which acts as a time delay device, turns sufficiently to align the opening 44 with the latch lever 32. When this occurs, the spring 42 becomes effective to further rock the latch lever from its dot-dash position 32a to its outer position 32b to withdrawn the same from the caging slot 34 in the inner gimbal and through the clearance hole 33 in the outer gimbal, thereby encaging the gyroscope. Thereafter, the gyroscope will perform as a two gimbal, free gyroscope.

The angular momentum of the rotor and incorporated spring 26 is preferably such that such rotating mass, even though coasting at a gradually decreasing speed of rotation throughout the flight of the missile, will be maintained above a critical operating speed until the missile reaches its target.

Due to the aforementioned construction, the gimbal assembly including the rotor and inner and outer gimbals can be constructed as separate subassembly units. The base 11, delay ring 45, latch lever 32 and trigger pawl 41 can be constructed as a sub-assembly unit separate from the subassembly unit including the rotor and gimbals, in which case both sub-assembly units can be readily assembled during the final stages of manufacturing.

FIG. 4 and 5 illustrate a modified form of the invention in which a tubular base 11a, similar to base 11 of FIG. 1, rotatably supports an outer gimbal 18a through ball bearings 15a and 16a. The outer gimbal supports an inner gimbal 21a through ball bearings 20a for movement about an inner gimbal axis extending perpendicular to and intersecting the outer gimbal axis.

The inner gimbal 21a is constructed similar to the gimbal 21 and comprises a sleeve 22a in which are mounted ball bearings 23a rotatably supporting the axle 24a of a rotor shell 25a. A torsion spring 26a is located within the rotor 25a and is permanently secured at its outer end to the peripheral wall of the rotor.

FIG. 4 illustrates the spring 26a in unwound condition, in which case the main body thereof is located against the inner periphery of the rotor shell. However, the inner end of the spring is biased radially inwardly and terminates in a bent-over ear 60 arranged to engage a shoulder 31a on the rotor sleeve 22a.

When the rotor is wound to energize the spring 26a, the body of the spring is wrapped around the sleeve 22a and thus exerts a torque tending to rotate the rotor.

The rotor is held in energized position by a combined latch and caging member 61 which normally fits through close fitting caging slots 62 and 63 in the outer and inner gimbals 18a and 21a, respectively. The member 61 also engages a latching slot 35a in the rotor. The latching lever 61 is formed into a yoke which straddles the tubular base 11a and is pivoted thereto on coaxially extending trunnion pins 62.

An inertia controlled time delay ring 65 having a relatively heavy rim is rotatably mounted on the base 11a and is urged counterclockwise, as viewed in FIG. 5, by a torsion spring 66 extending between the ring and a stud 67 carried by the base 11a.

The ring 65 has an annular camway 68 formed thereon, against which rides a button 70 attached to the member 61.

The ring 65 is normally held in energized condition wherein a raised portion 71 of the camway 68 holds the member 61 in full latching engagement with the rotor 25a by a latch 72 pivotally supported at 73 and engaging a pin 74 on the ring 65. An explosive powder squib 75 is connected to the latch 72 and, when fired, rocks the latch to release the ring 65 to the action of spring 66. At the start of rotation of the ring 65 the member 61 is allowed to drop sufficiently to release the rotor 25a so that its spring 26a may bring it up to speed. Due to the inertia of ring 65 an appreciable time elapses for the same to make substantially a complete revolution. When the ring 65 nears the end of its rotary motion, the button 70 drops off the end 76 of the camway 68, permitting the member 61 to withdraw from caging engagement with both the inner and outer gimbals, leaving the gyro free to perform as a two-gimbal free gyroscope.

When the rotor 25 is brought up to speed and the spring 26a becomes unwound, as shown in FIG. 4, the inner end of the spring flies outwardly due to centrifugal force, causing the ear 60 to disengage from the projection 30a on the sleeve 22a. However, when the rotor speed has later diminished to a point considerably below its critical operating speed the inner end of the spring will again move inwardly to cause the ear 60 to again engage the shoulder 30a. This feature enables rewinding of the spring during testing procedures.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention, what is desired to be secured by United States Letters Patent is:

1. A gyroscope comprising a rotor,
an inner gimbal supporting said rotor for rotation about a spin axis,
an outer gimbal supporting said inner gimbal for movement about an axis perpendicular to said spin axis,
means supporting said outer gimbal for movement about an outer gimbal axis perpendicular to said spin axis and said inner gimbal axis,
a rotor drive spring intermediate said inner gimbal and said rotor,
a combined caging and latching member engageable with at least one of said gimbals and with said rotor whereby to cage said one gimbal and latch said rotor against rotation by said spring, and
control means for causing said member to release said rotor for rotation and for thereafter further causing said member to uncage said one gimbal.

2. A gyroscope according to claim 1 wherein said member cages said inner gimbal only.

3. A gyroscope according to claim 1 including means for delaying movement of said member to uncage said one gimbal for a predetermined period after releasing said rotor for rotation.

4. A gyroscope according to claim 3 wherein said last mentioned means comprises a blocking element for blocking said member from uncaging said one gimbal, and
means operable in response to said control means upon causing said member to release said rotor for removing said blocking element from blocking relation with said member at a predetermined rate of speed.

5. A gyroscope according to claim 4 wherein said last mentioned means comprises a second spring.

6. A gyroscope according to claim 1 comprising a blocking element for blocking said member from uncaging said one gimbal,
spring means for moving said blocking element from blocking relation with said member,
a trigger element for normally holding said member in latching engagement with said rotor and for preventing movement of said blocking member by said spring means, and
means for actuating said trigger element to concurrently release said blocking element and said member.

7. A gyroscope according to claim 1 wherein said control means comprises
an inertia member,
means rotatably supporting said inertia member,
spring means for rotating said inertia member from an initial position,
said inertia member normally holding said first mentioned member in engagement with said rotor and said gimbals,
said inertia member being effective upon rotation thereof to a predetermined position to enable said first mentioned member to disengage from said rotor only, and
said inertia member being effective upon rotation thereof to a second position to enable said first mentioned member to disengage from said gimbal members.

8. A gyroscope according to claim 1 wherein said supporting means comprises
a base,
a spindle extending from one side of said outer gimbal coincident with said outer gimbal axis, and
bearings carried by said base for rotatably supporting said spindle.

9. A gyroscope comprising a rotor,
an inner gimbal supporting said rotor for rotation about a spin axis,
an outer gimbal supporting said inner gimbal for movement about an inner gimbal axis perpendicular to said spin axis,
means supporting said outer gimbal for movement about an outer gimbal axis perpendicular to said spin axis and said inner gimbal axis,
a rotor drive spring intermediate said inner gimbal and said rotor,
a combined caging and latching member engageable with said gimbals and with said rotor whereby to cage said gimbals and latch said rotor against rotation by said spring, and
control means including a control member operable at a predetermined speed for first releasing said member from latching engagement with said rotor and for thereafter releasing said member from caging relation with said gimbals.

10. A gyroscope according to claim 9 wherein said supporting means comprises
a base,
a spindle extending from one side of said outer gimbal coincident with said outer gimbal axis and rotatably supported by said base,
and wherein said control means comprises an inertia member supported by said base for movement about said outer gimbal axis,
yieldable means for rotating said inertia member,
said inertia member normally holding said first mentioned member in engagement with said rotor and said gimbals,
said inertia member being effective upon rotation thereof to a predetermined position to enable said first mentioned member to disengage from said rotor only, and
said inertia member being effective upon rotation thereof to a second predetermined position to enable said first mentioned member to disengage from said gimbal members.

11. A gyroscope comprising a rotor,
an inner gimbal supporting said rotor for rotation about a spin axis,
an outer gimbal supporting said inner gimbal for movement about an inner gimbal axis perpendicular to said spin axis,
a tubular base having an axis coincident with said outer gimbal axis,
a spindle extending from one side of said outer gimbal,
bearings carried by said base supporting said spindle for movement about said outer gimbal axis,
an inertia member supported by said base for movement about said outer gimbal axis,
spring means for rotating said inertia member from an initial position,
a combined latching and caging member pivotally supported by said base for movement about an axis perpendicular to said outer gimbal axis,
said latching and caging member being engageable with said rotor and said gimbals whereby to latch said rotor against rotation and to cage said gimbals,
spring means tending to disengage said latching and caging member from said rotor and said gimbals,
means on said inertia member maintaining said latching and caging member in engagement with said rotor and said gimbals when said inertia member is in said initial position,
said last mentioned means enabling disengagement of said latching and caging member upon movement of said inertia member to a predetermined position, and said last mentioned means enabling disengagement of said latching and caging member from said gimbals upon movement of said inertia member to a second predetermined position.

12. A gyroscope according to claim 1 wherein said spring is attached at one end thereof to said rotor and couples at the opposite end thereof to said inner gimbal when said rotor rotates slower than a predetermined speed, said spring being effective to uncouple from said inner gimbal when said rotor rotates faster than a predetermined speed.

13. A gyroscope according to claim 1 wherein said spring comprises a coil attached at its outer end to said rotor and effective to uncouple the inner end thereof from said internal gimbal when the force of said spring is expended and said rotor rotates faster than a predetermined speed,
  said spring being effective to couple said inner end thereof to said internal gimbal when said rotor rotates slower than said predetermined speed.

References Cited

UNITED STATES PATENTS

| | | | |
|---|---|---|---|
| 2,732,721 | 1/1956 | Summers | 74—5.12 X |
| 2,918,869 | 12/1959 | Cumming et al. | 74—5.7 |
| 3,263,508 | 8/1966 | Voge et al. | 74—5.12 |
| 3,270,568 | 9/1966 | Moravek et al. | 74—5.12 |

C. J. HUSAR, *Primary Examiner.*